July 15, 1958  S. G. YOUNG  2,842,976
GEAR MECHANISMS
Filed Nov. 21, 1955

Inventor
Sidney Geoffrey Young
by Stevens, Davis, Miller & Mosher
his attorneys

United States Patent Office 2,842,976
Patented July 15, 1958

2,842,976

GEAR MECHANISMS

Sidney Geoffrey Young, London, England

Application November 21, 1955, Serial No. 548,142

3 Claims. (Cl. 74—425)

This invention relates to improvements in gear mechanisms for use in tensioning the blade of a hack saw and in which a movement is transmitted from a worm, through a wormwheel and thence to a rack. It is often desired to arrange such gear trains so that the axis of the worm lies in a plane which extends along the rack and is perpendicular to the face thereof. In many cases the axis of the worm is also parallel to a line extending along the centre of the rack face; but alternatively these two lines may diverge to cut one another in the aforementioned plane.

The gear mechanism of this invention is particularly provided for tensioning the blade of a hack-saw by effecting relative movement of the handle portion of the hack-saw and the conventional bow member thereof.

In the known construction, the worm-wheel which is arranged intermediate between the worm and the rack has been mounted with its axis perpendicular to the said plane in which the worm axis lies. It has been found necessary in practice to provide such worm wheel with skew or helical teeth in order to mesh properly with the worm.

According to the present invention, the need to provide such skew or helical teeth is avoided by employing a simple spur wheel and inclining its axis to the above mentioned plane.

The use of a spur wheel greatly simplifies manufacture since spur wheels can so readily be made by parting extruded pinion bar, whilst the production of skew teeth requires an individual hobbing or other milling operation.

In the accompanying drawing, wherein the invention is diagrammatically illustrated:

Figure 1:
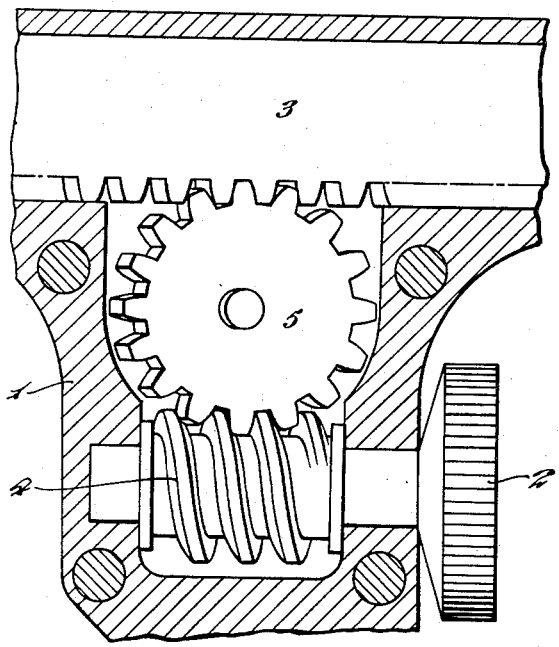
Fig. 1 is a side elevational view of the gear mechanism of this invention in combination with a hack saw, a portion of which is shown in section.
Figure 2:
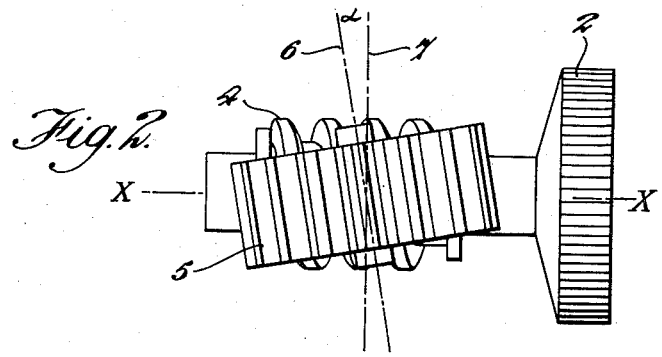
Fig. 2 is a top plan view of the worm and worm wheel of Fig. 1 with the rack and the hack saw frame portion omitted for clarity; and, Fig. 3 is a top plan view, similar to Fig. 2, of a modification.

Referring now more particularly to the drawing, and initially to Fig. 1, the invention comprises a hack saw having a frame portion 1 within which a worm 4 is journalled. The worm has a milled knob 2, that is disposed externally of the frame portion. The worm 4 meshes with a worm wheel 5 which is mounted on a stub shaft secured to the frame portion 1. The worm wheel 5 is engaged with the rack 3. In accordance with the invention, the worm wheel 5 has the normal transverse teeth of a spur wheel. The spur wheel and its axis 6 make an angle $a$ with the perpendicular 7 to the plane X—X passing through the axes of the worm 4 and the rack 3, the angle $a$ being equal to the angle of lead of the worm. It follows that the angle of the rack teeth to the longitudinal direction of the rack 3 will be 90° plus or minus $a$.

Figure 3:
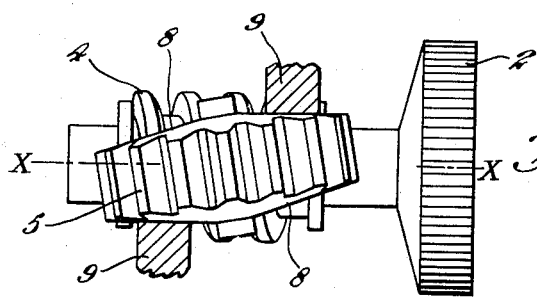

According to the modification shown in Fig. 3, each end face 8 of the spur wheel 5 is cut obliquely to form a convex cone, whose angle is equal to the complement of the lead angle of the worm so as to provide a surface parallel to the main plane X—X. This latter arrangement facilitates absorption of the endwise thrust on the spur wheel by an encasing side wall (not shown) or suitable thrust blocks 9 or bearing if necessary.

It should be emphasized that with the present arrangement applied to a hack saw, the advantageous disposition of the worm axis in the plane extending along the rack and perpendicular to the face thereof is retained, while at the same time the advantage of reduced cost, consequent upon the use as the intermediate element of a simple spur gear having straight teeth parallel with the spur gear axis, is obtained.

I claim:

1. A gear mechanism which comprises a worm, a wormwheel in the form of a spur-wheel meshing with said worm, teeth on said spur wheel extending parallel to the axis thereof, said axis being inclined to a plane perpendicular to the longitudinal axis of said worm by an angle substantially equal to the lead angle of the worm, and a rack in mesh with said spur wheel, the longitudinal axis of the rack lying in the same plane as the longitudinal axis of the worm.

2. In combination with a hack saw having a blade and a frame portion, a gear mechanism for tightening the blade, said mechanism comprising a rack, a worm having its axis lying in a plane that extends along and is perpendicular to the toothed face of said rack, a wormwheel in mesh with the worm and with the rack, and adapted to drive the latter longitudinally to tighten the blade, said worm-wheel being in the form of a spur-wheel having teeth extending parallel to the axis thereof, said axis being inclined to a plane perpendicular to the longitudinal axis of said worm by an angle substantially equal to the lead angle of the worm; and the teeth of the rack being inclined to the longitudinal direction of the rack at an acute angle substantially equal to the complement of the lead angle of said worm, said worm wheel and worm being journalled in the frame portion and said worm having a handle knob disposed externally of the frame portion.

3. A gear mechanism which comprises a worm, a wormwheel meshing with said worm, a toothed rack member meshing with said worm wheel and driven longitudinally thereby, the axis of the said worm lying in a plane that extends along and is perpendicular to the toothed face of said rack, the teeth of said rack being inclined to its longitudinal direction at an acute angle substantially equal to the complement of the lead angle of said worm, said worm-wheel being in the form of a spur-wheel having teeth extending parallel to the axis thereof, said spur wheel having both its faces cut obliquely to form convex cones whose axes coincide with the axis of the wheel and whose angles are both equal to twice the complement of the lead angle of said worm, the axis of said spur wheel being inclined to a plane perpendicular to the longitudinal axis of said worm by an angle substantially equal to the lead angle of the worm.

References Cited in the file of this patent

UNITED STATES PATENTS

| 243,634 | Sellers et al. | June 28, 1881 |
| 2,651,212 | Mackman | Sept. 8, 1953 |
| 2,688,881 | Crossland | Sept. 14, 1954 |

FOREIGN PATENTS

| 740,823 | Great Britain | Nov. 23, 1955 |